3,256,256
PROCESS FOR PRODUCING IMPROVED VINYL CHLORIDE COPOLYMERS AND PRODUCTS THEREOF
Frederick P. Reding, Charleston, and Edgar W. Wise, South Charleston, W. Va., and John H. Hoge, New Knoxville, Ohio, assignors to Union Carbide Corporation, a corporation of New York
No Drawing. Filed Dec. 29, 1960, Ser. No. 79,169
9 Claims. (Cl. 260—87.5)

The present invention is concerned with novel vinyl chloride polymers having improved physical properties and processing characteristics. The invention is also concerned with novel processes for the production of the aforementioned vinyl chloride polymers.

Vinyl chloride polymers are, in general, rigid compositions characterized by a high degree of resistance to chemical attack, and consequently have come into extensive use in the chemical processing industry as well as in other manufacturing applications. Such polymers are, for example, widely used as moldings, piping, sheeting, and the like.

Unfortunately, however, rigid vinyl chloride polymers are often difficult to extrude or to flux and mill satisfactorily on conventional steam heated equipment. This difficulty is due in part to the high melting point ordinarily possessed by the polymers and to the high viscosity evidenced by the polymers at temperatures above the softening point of the polymers and in the range associated with conventional manufacturing operations of the type described above. Moreover, this difficulty is aggravated by the tendency of the polymers to decompose or to thermally degrade before reaching a viscosity sufficiently low as to assure the good flow characteristic necessary to many manufacturing operations. Consequently, the use of rigid vinyl chloride polymers in these applications has found only limited commercial acceptance.

Heretofore, attempts to improve the physical properties and processing characteristics of vinyl chloride polymers as by the incorporation of substantial quantities of plasticizers, butadiene rubbers or similar compounding ingredients, or by the copolymerization of vinyl chloride with substantial quantities of other vinyl monomers in accordance with conventional polymerization processes have ordinarily proven unsatisfactory in that any improvement thereby achieved has frequently been accompanied by an undue sacrifice of other desirable physical properties of the polymers, such as the rigidity of the polymers, the heat-distortion temperature of the polymers, etc. For these reasons, among others, the development of improved rigid vinyl chloride polymers has continued to receive considerable attention from those skilled in the art.

It has now been found that rigid vinyl chloride polymers evidencing a lower melting point and a higher degree of thermal stability, as well as other improved physical properties and processing characteristics, can be obtained by the polymerization of vinyl chloride in the presence of small amounts of certain branch-chained alpha-olefins, at a temperature of from about 60° C. to about 120° C. and at pressures of from about 15,000 pounds per square inch to about 50,000 pounds per square inch, in accordance with otherwise conventional polymerization techniques. The branch-chained alpha-olefins contemplated in this regard can be defined more particularly by the general formula $H_2C=CHR$ wherein R designates a saturated aliphatic radical, including both acylic and alicyclic saturated aliphatic radicals, containing from 3 to about 12 carbon atoms and possessing at least one tertiary carbon atom. The preferred branch-chained alpha-olefins are those compounds defined by the above formula wherein R designates a saturated aliphatic radical containing from 3 to about 8 carbon atoms and especially wherein the radical R is connected to the adjacent unsaturated carbon atom by a tertiary carbon atom thereof. Suitable branch-chained alpha-olefins include, for example, 3-methylbutene-1, 3-methylpentene-1, 4-methylpentene-1, vinylcyclopentane, vinylcyclohexane, 1-vinyl-4-methylcyclohexane, 3,3-dimethylbutene-1, 2-vinyl-[2,2,1]-bicycloheptane, etc., and the like.

The rigid vinyl chloride polymers produced in accordance with this invention can be used in any of the applications in which conventional vinyl chloride polymers of similar chemical composition have heretofore been employed, as well as those previously believed precluded for such polymers, as, for instance, extrusion and injection molding operations, and in any given use will exhibit properties equal or superior to those of the conventional vinyl chloride polymers. By way of illustration, conventional vinyl chloride homopolymers produced at a temperature in the range of from about 30° C. to about 50° C. and generally under autogeneous pressure ordinarily have a melting point of at least about 200° C., and often in the range of from about 210° C. to about 230° C. and higher. In contrast therewith, the vinyl chloride polymers of this invention have a desirable lower melting point which varies in the range of from about 120° C. to about 190° C., depending upon the reaction conditions employed in connection with their production. Thus, for example, under the preferred reaction conditions hereinbelow described, vinyl chloride polymers having a melting point in the range of from about 135° C. to about 170° C. are usually obtained.

Since vinyl chloride polymers of the type described herein evidence only a degree of crystallinity, birefringence or other techniques ordinarily employed to determine the melting point of crystalline polymers cannot be utilized with these polymers. Instead, the melting point of the vinyl chloride polymers is determined by measuring the stiffness modulus of the polymers as a function of temperature over a wide temperature range. Such a technique involves preparing small strips of the polymers measuring two inches long, one-eighth inch wide and 0.01 to 0.02 inch thick and subsequently stretching the strips in an Instron tester, at a rate of 10 percent of the strip length per minute, to a total extension of 1 percent. The stiffness modulus is taken as 100 times the force required to stretch the polymer strip 1 percent. Stiffness modulus values are measured in this manner at a series of temperatures generally varying in increments of 10° C. and the values then plotted graphically against the temperatures at which the values were obtained. The first sharp drop in the stiffness modulus of the polymer with increasing temperature is associated with the softening point or glass-transition temperature of the polymer, that is to say, the temperature at which the polymer goes from a rigid material to a soft, flexible material. Such a temperature, more particularly, is taken to be and defined as that temperature at which the stiffness modulus of the polymer is 10,000 pounds per square inch, a value which has been found to be in approximately the middle of the first sharp drop in the stiffness modulus as graphically depicted. The second sharp drop in the stiffness modulus of the polymer with increasing temperature is associated with the melting point of the polymer. For similar reasons to those described above, the latter temperature is taken to be and defined as that temperature at which the stiffness modulus of the polymer is 10 pounds per square inch. Accordingly the novel vinyl chloride polymers of this invention have a melting point, as determined in this manner, which varies in the range of from about 120° C. to about 190° C., depending upon the reaction conditions employed in connection with their production.

The above technique can be employed effectively in determining the melting point of the vinyl chloride polymers of this invention since, due to their improved thermal stability, the polymers do not degrade with any appreciable degree of rapidity until subjected to temperatures substantially above their melting point. However, conventional vinyl chloride polymers, such as poly(vinyl chloride) and copolymers of vinyl chloride with small amounts of other polymerizable vinyl monomers, produced at temperatures up to about 50° C. and generally under autogeneous pressures, ordinarily degrade rapidly at temperatures below their melting point, that is to say, before the melting point of the polymers is reached. Hence, the melting point of these polymers cannot be determined directly, but has instead been determined by the technique described above using strips prepared from various plasticized polymer compositions containing varying concentrations of plasticizer. The particular plasticizer employed in this connection was dioctyl phthalate, although other conventional vinyl plasticizers are also suitable.

Since the plasticizer depresses the melting point of the polymer in a known manner, the melting point of the unplasticized polymer can then be calculated from the relationship.

$$\frac{1}{T} - \frac{1}{T_0} = -\frac{\Delta H}{RT} \ln Na$$

wherein T is the melting point of the plasticized polymer in degrees absolute, $T_0$ is the melting point of the unplasticized polymer in degrees absolute, $\Delta H$ is the heat of fusion of poly(vinyl chloride) and $Na$ is the mole fraction of the polymer in the plasticized polymer composition. The melting point of the unplasticized polymer is then determined by graphically plotting T against $Na$ for various plasticized polymer compositions and extrapolating the resulting graph to $Na=1$. Further reference to this technique can be found in Flory, Principles of Polymer Chemistry, Cornell University Press, 1953. In this manner, the melting point of conventional vinyl chloride homopolymers produced at a temperature in the range of 30° C. to 50° C. and under autogenous pressure has been found, for example, to vary in the range of from about 210° C. to about 230° C.

The vinyl chloride polymers of this invention not only have a desirably lower melting point than conventional vinyl chloride polymers of similar chemical composition, but also have a desirably higher degree of thermal stability. The improved thermal stability of the vinyl chloride polymers of this invention is demonstrated by the fact that at any given elevated temperature, considerably more time is required for their darkening or blackening as compared with the conventional vinyl chloride polymers. A more quantitative evaluation of the improvement in thermal stability realized in accordance with this invention can be made by boiling a one percent by weight solution of the polymer in cyclohexanone at a temperature of 155° C., under a reflux and under a nitrogen atmosphere, for a period of 1.5 hours. The optical density of the solution contained in a one-centimeter spectral cell is then measured at 460 millimicrons using an ultraviolet spectrometer. The optical density of the solution thus obtained is a direct measure of the dehydrochlorination which has occurred during the heating of the polymer, with low optical density values indicating the presence of a polymer having a high degree of thermal stability, and conversely, high optical density values indicating the presence of polymer having poor thermal stability. Determined in this manner, the optical density of solutions containing the vinyl chloride polymers of this invention varies broadly in the range of from about 0.2 to about 0.8 or slightly higher, and is most frequently in the range of from about 0.3 to about 0.7. In contrast therewith, solutions containing conventional vinyl chloride polymers of similar chemical composition ordinarily evidence an optical density of about 1.0 and higher when treated as indicated above. For simplification and clarity, the term "optical density" as hereinafter employed will refer to the polymer tested, but is in all instances meant to describe the value obtained from a solution of the polymer, determined as indicated above.

The improved lower melting point and higher heat stability of the vinyl chloride polymers of this invention renders such polymers particularly suited for use in applications such as extrusion or injection molding operations which were heretofore precluded for rigid vinyl chloride polymers of similar composition. In such operations, it is essential that the polymer melt or become relatively fluid, that is to say, possess a low viscosity, at a temperature below that at which it decomposes or degrades. Moreover, the greater the difference between the melting point of the polymer, or the temperature at which the polymer has a sufficiently low viscosity, and higher the decomposition temperature of the polymer, the more useful the polymer is in such operations since a wider latitude of fabricating conditions can be utilized.

The vinyl chloride polymers of this invention are also characterized and distinguished from conventional vinyl chloride polymers of similar chemical composition by having a measurable melt index in the range of from about 0.1 or slightly less to about 100 or slightly higher, and most frequently in the range of from about 0.5 to about 50. The term "melt index" as employed herein is meant to define the value obtained in accordance with ASTM method D–1238–52T. In accordance wth this method, the polymer being evaluated is extruded in an I.C.I. plastometer. The melt index value is taken as the weight of extrudate in decigrams per minute measured at a temperature of 190° C. under a load of 44.3 pounds per square inch. The melt index is considered to be a measure of the molecular weight of the polymer in that higher molecular weight polymers have a lower melt index and, conversely, lower molecular weight polymers have a higher melt index. The melt index is also affected by the melting point and viscosity of the polymer in that polymers having a lower melting point, and therefore generally a lower viscosity at the test temperature, will ordinarily have a higher melt index.

It is to be noted that the effective applicability of this method to the vinyl chloride polymers of this invention is possible due in significant part to the lower melting point and improved thermal stability of the polymers. It is in fact difficult to compare the melt index of the vinyl chloride polymers of this invention with conventional vinyl chloride polymers of similar composition which appear to have a much lower melt index since the latter products do not possess sufficient heat stability to withstand the temperature of 190° C. at which the determination of melt index as described above is conducted. Moreover, this test method further indicates the improvement in processability, especially lower viscosity, characteristic of the vinyl chloride polymers of this invention.

The improved processing characteristics of the vinyl chloride polymers of this invention are also evidenced by the fact that the polymers can be fluxed and milled by standard operations at a temperature considerably below that required in connection with the fluxing or milling of conventional vinyl chloride polymers of similar composition. Furthermore, at any given temperature above the softening point of the polymer, the vinyl chloride polymers of this invention also generally evidence a lower viscosity than that of the conventional vinyl chloride polymers. The fluxing or milling of the vinyl chloride polymers of this invention therefore ordinarily involves shorter periods of operation. Thus, taken with the lower temperatures required for such operations, the fluxing or milling of the vinyl chloride polymers of this invention ordinarily represents a more acceptable commercial procedure than similar procedures involving the use of conventional rigid vinyl chloride polymers. It is of course also true, as hereinabove noted, that the lower viscosities evidenced by the vinyl chloride polymers of this invention is a contributing factor which renders such polymers especially suited for use in extrustion or injection molding operations and the like.

In an embodiment of the polymerization process of this invention, a branch-chained alpha-olefin, as hereinabove described, is generally employed as a comonomer in a proportion of up to about 7 to 8 percent by weight based upon the total weight of the monomer charged. The resulting polymer product will ordinarily contain up to about 3 to about 4 percent by weight of the polymerized comonomer, or about one-half the proportion of the comonomer introduced in the feed. Higher proportions of the comonomer in the feed are normally avoided since the solvent resistance of the resulting polymer is thereby adversely affected and the softening point of the polymer is lowered to an extent precluding the use of the polymer as a rigid product. Thus, the amount of comonomer entering into the polymer product can be controlled by, and is dependent upon the proportion of the comonomer in the monomer feed.

The actual amount of the comonomer entering into the polymer product is only approximately determinable by conventional chlorine analysis such as the Paar bomb technique. That this is true can be seen from the fact that vinyl chloride homopolymers are determined by such chlorine analysis to contain only 98 to 99 percent by weight of polymerized vinyl chloride, notwithstanding the fact that vinyl chloride is the only monomer employed. This ambiguity apparently arises as a consequence of the dehydrochlorination which, as is well known, often readily occurs in the production and/or subsequent treatment of vinyl chloride polymers, and which results in the loss of chlorine by the polymer. Under all circumstances, however, it has been found that the vinyl chloride polymers of this invention contain at least about 95 percent by weight of vinyl chloride, a fact with which other analytical techniques, such as infra-red analysis, are in confirmation.

While the polymers produced in accordance with this invention utilizing about 2 percent by weight of comonomer in the feed are difficult to distinguish by chlorine analysis from vinyl chloride homopolymers for the above reasons, the products may, however, be distinguished by infra-red analysis and are further distinguishable by their properties in that the polymers produced when a comonomer is present, other reaction conditions being constant, have a lower melting point than do the polymers produced when vinyl chloride is the sole monomer employed, and frequently evidence better thermal stability. It has also been noted that the vinyl chloride polymers of this invention possess a softening point or glass-transition temperature approximating that of vinyl chloride homopolymers produced under otherwise constant reaction conditions in the absence of a comonomer, viz. in the range of from about 73° C. to about 80° C. By such a property, the vinyl chloride polymers of this invention are distinguished, for example, from the vinyl chloride polymers produced by the polymerization of vinyl chloride under otherwise constant reaction conditions, in the presence of a low molecular weight—or linear olefin which is outside the contemplation of this invention insofar as the comonomer is concerned.

The polymerization process of this invention can be carried out in bulk or as a solution, emulsion or suspension in a suitable inert diluent such as water, benzene, heptane and the like. In addition, a catalytic amount of a conventional free radical polymerization catalyst, such as isopropyl percarbonate di-tertiarybutyl peroxide, acetyl peroxide, benzoyl peroxide, lauroyl peroxide, azodiisobutyronitrile and the like, is generally used. Particularly good results can be obtained in this connection when the polymerization catalyst is incorporated in the polymerization charge in a proportion of from about 0.001 percent to about 1 percent by weight based upon the total weight of monomer charged, while somewhat higher or lower proportions of catalyst can also be employed. Moreover, the polymerization can be carried out either batchwise or as a continuous process.

Of importance to the polymerization process of this invention, and to the improved properties of the polymer products obtained thereby, is the reaction temperature, such temperature falling within the range of from about 60° C. to about 120° C., and preferably, in the range of from about 70° C. to about 100° C. As the reaction temperature is increased, other reaction conditions being constant, a corresponding decrease in the melting point and increase in the thermal stability of the polymer products has been noted. At temperatures substantially above about 120° C., however, the polymers obtained are generally too brittle to be useful as rigid products. Thus, the use of such substantially higher temperatures is excluded from the scope of the process of this invention. The use of reaction temperatures below about 60° C., on the other hand, does not permit the realization of a desired improvement in physical properties so as to warrant use in accordance with this invention.

The reaction pressure employed in the polymerization process of this invention is necessarily maintained broadly in the range of from about 15,000 pounds per square inch to about 50,000 pounds per square inch or higher, such higher pressures being limited only by practical processing considerations such as equipment limitations and the like. When the polymerization temperature is within the preferred range indicated above, the pressure is preferably in the range of from about 20,000 pounds per square inch to about 40,000 pounds per square inch. With pressures substantially below about 15,000 pounds per square inch, however, the resulting polymer product will generally have a melt index well above 100 and prove to be excessively brittle. Therefore, use of such lower pressures is also excluded from the scope of this invention. Accordingly, the actual pressure to be employed in any given reaction will depend to a large extent upon the reaction temperature utilized, and can readily be determined by one skilled in the art in light of this disclosure.

The reaction period need only be sufficient to produce a polymeric product, and will not ordinarily affect the improved physical properties and processability of the polymer products of this invention, but only the product yield. Thus, reaction periods of from about 30 seconds to about 10 hours can be employed efficiently, with longer or shorter reaction periods also being operable. Longer reaction periods of up to about 24 hours or more are often used, for example, in connection with batch processes. Upon completion of the polymerization, the resulting polymer product can be recovered in any conventional or convenient manner.

The practice of this invention, and the advantages realizable thereby, can be illustrated further in connection with the following examples, which it is to be noted, in no way limit the invention. In the examples, the reduced viscosity of the vinyl chloride polymer is meant to define the value obtained by dividing the specific viscosity of the vinyl chloride polymer in solution by the concentration of the polymer in the solution, the concentration being calculated in grams of resin per 100 milliliters of solvent at a given temperature. The specific viscosity is obtained by dividing the difference between the viscosity of the polymer solution and the viscosity of the solvent by the viscosity of the solvent.

The reduced viscosity is a measure of the molecular weight of the polymer. A higher reduced viscosity indicates a higher molecular weight polymer. Conversely, a lower reduced viscosity indicates a lower molecular weight polymer. In all cases, the reduced viscosity values set forth below are determined at a concentration of 0.2 gram of resin per 100 milliliters of solvent, and at a temperature of 20° C. using cyclohexanone as the solvent. The reduced viscosities of the vinyl chloride polymers of this invention were found in this manner to vary in the range of from about 0.4 to about 1.0.

*Example 1*

A stainless steel-lined autoclave having a volume of 1480 cubic centimeters was evacuated, and a charge of 800 grams of water and 0.4 gram of isopropyl percarbonate was drawn into the autoclave. The autoclave was then pressured to 20,000 pounds per square inch with a mixture of vinyl chloride and 3-methylbutene-1 containing 95 percent by weight of vinyl chloride and 5 percent by weight of 3-methylbutene-1. While the autoclave was being charged, heat was applied to bring the temperature up to 30° C. A polymerization reaction ensued and was allowed to proceed at the aforementioned temperature and pressure for a period of 3 hours and 43 minutes. Upon completion of the reaction, the autoclave was found to contain 4 grams of a vinyl chloride/3-methylbutene-1 copolymer which had a 3-methylbutene-1 content of less than 2 percent by weight as determined by infra-red analysis, and a vinyl chloride content of at least 95.4 percent by weight as determined by chlorine analysis. The polymer had the following properties: a reduced viscosity of 0.922, a softening point of 80° C. and an optical density of 0.64. Molded plaques prepared from the polymer product were rigid and displayed excellent clarity and toughness.

*Example 2*

A stainless steel-lined autoclave having a volume of 1480 cubic centimeters was evacuated, and a charge of 800 grams of water, 85 grams of 4-methylpentene-1 and 0.4 gram of azodiisobutyronitrile was drawn into the autoclave. The autoclave was then pressured with vinyl chloride to 20,000 pounds per square inch. While the autoclave was being pressured, heat was applied to bring the temperature up to 80° C. A polymerization reaction ensued and was allowed to proceed at the aforementioned temperature and pressure for a period of 11 minutes. Upon completion of the reaction, the autoclave was found to contain 152 grams of a vinyl chloride/4-methylpentene-1 copolymer which had a 4-methylpentene-1 content of less than 2 percent by weight as determined by infra-red analysis, and a vinyl chloride content of at least 95.4 percent by weight as determined by chlorine analysis. The polymer had the following properties: a reduced viscosity of 0.456, a melt index of 24 and an optical density of 0.8. Molded plaques prepared from the polymer product were rigid and displayed excellent clarity.

*Example 3*

A stainless steel-lined autoclave having a volume of 1480 cubic centimeters was evacuated, and a charge of 1050 grams of water, 60 grams of vinyl cyclohexane and 0.3 gram of isopropyl percarbonate was drawn into the autoclave. The autoclave was then pressured with vinyl chloride to 20,000 pounds per square inch. While the autoclave was being pressured, heat was applied to bring the temperature up to 30° C. A polymerization reaction ensued and was allowed to proceed at the aforementioned temperature and pressure for a period of 8 hours. Upon completion of the reaction, the autoclave was found to contain 13 grams of a vinyl chloride/vinyl cyclohexane copolymer which had a vinyl cyclohexane content of less than 2 percent by weight as determined by infra-red analysis, and a vinyl chloride content of at least 97.3 percent by weight as determined by chlorine analysis. The polymer had the following properties: a reduced viscosity of 0.685, an optical density of 0.7 and a melt index of approximately 0.2 as extrapolated from the reduced viscosity of the polymer and from a graphical plot of melt index values vs. reduced viscosities. Molded plaques prepared from the polymer product were rigid and displayed excellent clarity and toughness.

The invention is susceptible of further modification within the scope of the appended claims.

What is claimed is:

1. A process for the production of rigid copolymers of vinyl chloride with a branch-chained alpha-olefin represented by the formula $H_2C=CHR$ wherein R designates a saturated aliphatic radical containing from 3 to 12 carbon atoms and possessing at least one tertiary carbon atom, said copolymers containing at least 95 percent by weight of polymerized vinyl chloride and having a melt index of from about 0.1 to about 100, a melting point of from about 120° C. to about 190° C. and an optical density of from about 0.2 to about 0.8 as determined from a one percent by weight solution of the copolymer in cyclohexanone, which process comprises polymerizing a mixture of vinyl chloride and said branch-chained alpha-olefin containing up to about 8 percent by weight of said branch-chained alpha-olefin based upon the weight of said mixture, in contact with a catalytic amount of a free-radical polymerization catalyst, at a temperature of from about 60° C. to about 120° C., under a pressure of at least about 15,000 pounds per square inch, for a period of time sufficient to produce a polymeric product.

2. A process for the production of rigid copolymers of vinyl chloride with a branch-chained alpha-olefin represented by the formula $H_2C=CHR$ wherein R designates a saturated aliphatic radical containing from 3 to 8 carbon atoms and possessing at least one tertiary carbon atom, said copolymers containing at least 95 percent by weight of polymerized vinyl chloride and having a melt index of from about 0.5 to about 50, a melting point of from about 135° C. to about 170° C. and an optical density of from about 0.2 to about 0.8 as determined from a one percent by weight solution of the copolymer in cyclohexanone, which process comprises polymerizing a mixture of vinyl chloride and said branch-chained alpha-olefin containing up to about 8 percent by weight of said branch-chained alpha-olefin based upon the weight of said mixture, in contact with a catalytic amount of a free-radical polymerization catalyst, at a temperature of from about 70° C. to about 100° C., under a pressure of from about 20,000 pounds per square inch to about 40,000 pounds per square inch, for a period of time sufficient to produce a polymeric product.

3. The process according to claim 2 wherein the branch-chained alpha olefin is 3-methylbutene-1.

4. The process according to claim 2 wherein the branch-chained alpha olefin is 4-methylpentene-1.

5. The process according to claim 2 wherein the branch-chained alpha olefin is vinyl cyclohexane.

6. A copolymer produced by the process of claim 1.

7. A copolymer produced by the process of claim 3.

8. A copolymer produced by the process of claim 4.

9. A copolymer produced by the process of claim 5.

(References on following page)

References Cited by the Examiner

UNITED STATES PATENTS

| | | | |
|---|---|---|---|
| 2,379,292 | 6/1945 | Gleason | 260—87.5 |
| 2,422,392 | 6/1947 | Brubaker | 260—87.5 |
| 2,448,391 | 8/1948 | Pyle | 260—87.5 |
| 2,531,196 | 11/1950 | Brubaker et al. | 260—87.5 |
| 2,532,727 | 12/1950 | Larchar | 260—87.5 |
| 2,816,883 | 12/1957 | Larchar et al. | 260—94.9 |
| 2,842,474 | 7/1958 | Pratt | 260—87.5 |

OTHER REFERENCES

Frith et al., Linear Polymers, pp. 328–333, Longmans, New York (1951).

Simonds et al., Handbook of Plastics, 2d, p. 1093, Van Nostrand, New York (1949).

JOSEPH L. SCHOFER, *Primary Examiner.*

HAROLD N. BURSTEIN, *Examiner.*

JOHN F. McNALLY, *Assistant Examiner.*